(No Model.)
S. H. SHORT.
ELECTRIC RAILWAY TROLLEY AND SUPPORT.
No. 396,618. Patented Jan. 22, 1889.
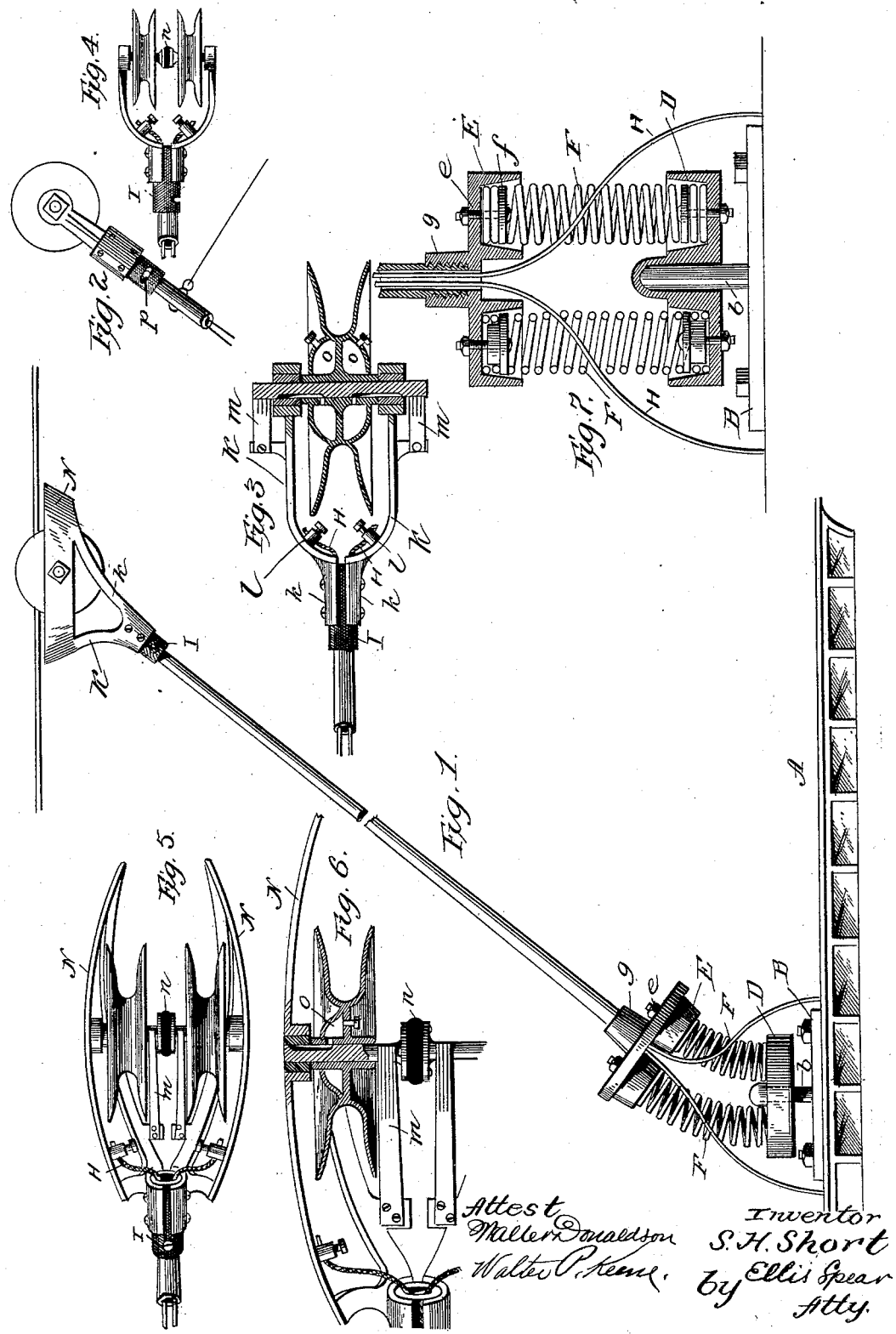

UNITED STATES PATENT OFFICE.

SIDNEY H. SHORT, OF COLUMBUS, OHIO.

ELECTRIC-RAILWAY TROLLEY AND SUPPORT.

SPECIFICATION forming part of Letters Patent No. 396,618, dated January 22, 1889.

Application filed November 12, 1888. Serial No. 290,614. (No model.)

*To all whom it may concern:*

Be it known that I, SIDNEY H. SHORT, of Columbus, in the county of Franklin and State of Ohio, have invented a new and useful Improvement in Electric-Railway Trolleys for Under Contact and Supports for the Same; and I do hereby declare that the following is a full, clear, and exact description of the same.

My invention relates to trolleys for under contact in connection with overhead conductors for electric railways and to the yielding supports for said trolleys.

The invention consists of improved details of construction, as and for the purpose hereinafter fully explained. These details are shown in the accompanying drawings, in which—

Figure 1 represents a side elevation of the trolley with its support and the conductor in contact with the trolley. Fig. 2 shows a like elevation of the upper part of the trolley-support with a side of the trolley removed. Fig. 3 is an enlarged plan view, partly in section, of the trolley. Fig. 4 is a top view of Fig. 2. Figs. 5 and 6 are enlarged views, partly in plan and partly in section, showing modifications. Fig. 7 is an enlarged view, in vertical section, of the spring-support for the trolley-rod.

In the drawings, A represents the top of the car, upon which is fixed a plate, B, having a stud, $b$, projecting upward. The spring-base consists mainly of two caps, D and E, and interposed springs F. The caps are formed with sockets to receive the ends of the springs, and the springs are held therein by bolts and nuts, the bolts $e$ passing through plates $f$, inserted between coils of the spring and through the caps, by means of which the springs are held in their seats against tension, and normally the coils of the spring are somewhat open, as shown in Fig. 7. The bottom cap, D, is formed with a central socket, which fits the stud $b$ on the plate B, and this holds the spring-base securely in place, allowing it to turn in horizontal plane freely. The other cap has a central tubular projection, $g$, with interior thread, into which is screwed the rod which carries the trolley, which is made hollow for the passage of the wires which lead to the terminals of the motor. The two springs are arranged in the same plane, or in plane parallel with the contact-wheels—that is to say, one in front and one in rear of the axis of the trolley-rod, so that as the trolley-rod is swayed to bring those wheels into contact with the conductors one spring is compressed and the other is put under tension, and the compressed spring, being upon one side of the central axis, acts as a yielding support, while the other, acting under tension, draws the trolley into contact with the conductor, and the construction and arrangement give a greater and more sensitive spring-power in the proper direction than the same amount of spring metal employed in any arrangement of spring heretofore known to me. The wires H H, leading to the terminals, are carried out on one side of the springs.

Fig. 3 shows the details of construction of the connection with the upper part of the trolley-rod. On the upper end of the trolley-rod is fixed an insulating-sleeve, I, and to this are screwed the arms K K, in which are journaled the wheel or wheels which run immediately in contact with the conductors. In this figure is shown only one wheel. These arms have half-round shanks $k$, which fit upon the insulating-sleeve I, so that they are insulated from the trolley-rod. The conducting-wires H are brought up through and are attached to binding-posts $l$ on the inside of the arms, so that the current is through the arms. In the ends of the arms are formed the bearings for the axle or axles of the wheel or wheels. These bearings are made removable, and are of polygonal form on their external surface to prevent them turning in the arms, and they may be removed when worn out. As the wheel runs at a somewhat high rate of speed, I provide for automatic lubrication by means of cavities $o\ o$ in the body of the wheel, which have small holes leading into slots extending outwardly to the bearings, so that the oil may be fed to the bearings. These bearings when they are subjected to wear under the influence of the passage of the current, which must go through the wheel when it is in connection with the conductor, wear out rapidly. For the purpose, therefore, of relieving the bearings, I extend the shaft of the wheel outside the bearings and provide a brush, $m$, set upon a stud on the arm K, so that the current may pass from the arm through the brush to the axle.

For my improved system shown in Letters Patent No. 394,139, dated December 4, 1888, a double-line conductor is used, and with it two wheels. This is also shown in an application of even date herewith, Serial No. 290,615; and in said application also are shown the contacts for each member of the double line and independent connections between these to the terminals of the motor, this feature not being claimed in said applications.

For the purpose of conducting the current from one wire or member of the double line through the motor back to the other, it is necessary that these wheels should be insulated from each other. This is effected by forming the axles of the wheels, which turn therewith, in two parts and connecting them through an insulating-plate, $n$, Figs. 5 and 6. Where double wheels are used, the brushes $m$ $m$ may be placed on the inner ends of the axles, as shown in Figs. 5 and 6. In these figures also are shown the contact-plates N N, which are curved from end to end and operate the levers which control the switch.

In order to give the wheels sufficient freedom of movement under all circumstances, I swivel their connection to the rod, so as to allow a partial rotary movement. This is accomplished by making the insulating-sleeve I loose upon the upper end of the rod and holding it thereon by means of a pin, $p$, passing through a slot in the sleeve.

I claim as my invention—

1. The spring-support for the trolley-rod, consisting of a pair of springs attached to suitable caps and arranged one in front and the other in rear of the axis of the trolley-rod, whereby one is made to act under tension and the other under compression, substantially as described.

2. The lower cap formed with a socket, the upper cap carrying the trolley-rod, seats in said caps for the springs, and springs connected to said seats and arranged to act under tension or compression, and a stud, $b$, fitted to the central socket, substantially as described.

3. The insulating-sleeve on the upper end of the trolley-rod, the arms K, having shanks fixed to the sleeve, and the trolley-wheels, all substantially as described.

4. In combination with the shaft of the contact-wheel, the arms K, and the brush-connection extending directly between the wheel-axle and the arms K, substantially as described.

5. In combination with a double-line conductor, a trolley having a pair of wheels mounted on axles which revolve therewith, insulating material between the ends of the axles, said wheels being arranged each to bear upon one of the wires of the double line, and independent electrical connections between each axle and one terminal of the motor, substantially as described.

In testimony whereof I have signed my name to this specification in the presence of two subscribing witnesses.

SIDNEY H. SHORT.

Witnesses:
FRANK L. MIDDLETON,
WALTER DONALDSON.